Jan. 10, 1967  R. SOLISCH  3,297,394
PROJECTION OBJECTIVE CONSISTING OF OBJECT-SIDE NEGATIVE
COMPONENT AND IMAGE-SIDE POSITIVE MULTILENS COMPONENT
Filed Dec. 3, 1964
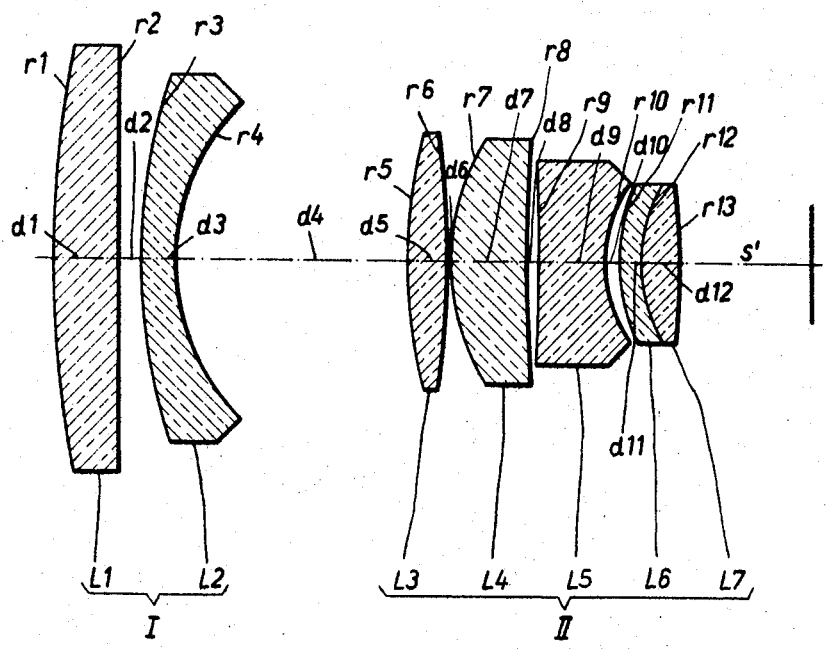
Inventor:
Rudolf Solisch
Karl J. Ross
AGENT

United States Patent Office 3,297,394
Patented Jan. 10, 1967

1

3,297,394
PROJECTION OBJECTIVE CONSISTING OF OBJECT-SIDE NEGATIVE COMPONENT AND IMAGE-SIDE POSITIVE MULTILENS COMPONENT
Rudolf Solisch, Bad Kreuznach, Germany, assignor to Jos. Schneider & Co., Bad Kreuznach, Rhineland, Germany, a corporation of Germany
Filed Dec. 3, 1964, Ser. No. 415,643
Claims priority, application Germany, Dec. 4, 1963, Sch 34,267
2 Claims. (Cl. 350—215)

My present invention relates to an optical objective system of the general type disclosed in my prior U.S. Patent No. 2,878,724, issued March 24, 1959, and more particularly to an objective adapted to be used for the projection of photographic or cinematographic pictures.

A system of this type consists of an object-side component of negative refractivity and a multilens image-side component of positive refractivity separated from each other by a relatively large air space, the object-side component being in turn constituted by two air-spaced lens members. The terms "object side" and "image side" are intended to refer to the sides of the longer and the shorter light rays, respectively, and the lens members are numbered conventionally in ascending order from the object side to the image side even though, in the case of a projector, the light rays pass in the opposite direction.

The object disclosed in my aforementioned prior patent, as well as an improved system which is the subject of commonly assigned application Ser. No. 188,331, filed April 18, 1962, by Walter Wöltche, and me, now Patent No. 3,217,598, is of the wide-angle type (with a field angle of about 80° or more) but has a relatively small aperture ratio, i.e., between 1:3 and 1:4. The general object of my present invention is to provide an objective of this general type which, while still retaining a fairly large field angle (e.g., of about 35°), has a considerably larger aperture ratio, specifically of 1:1.5 or better.

It is also an object of my present invention to provide an objective of this character which is highly corrected throughout its field without, however, requiring the use of expensive glasses of high refractive index in the large-diameter lenses of its object-side component.

I have found, in accordance with this invention, that the foregoing objects can be realized by the provision of an objective system of the general type set forth whose dispersive object-side component consists of a positively refracting first lens member and a preferably meniscus-shaped negatively refracting second lens member air-spaced therefrom, the axial separation between the two components being greater than half the total axial length of the system; the individual focal length of the object-side component should have an absolute value greater than 2.5 times that of the individual focal length of the collective image-side component and also greater than 2.5 times the value of the (positive) overall focal length of the system.

With such a distribution of the individual focal lengths of the two components it is possible to achieve a substantially complete suppression of spherical zonal aberations within a field angle of 35°, the undercorrection of this aberration being not greater than $0.0042\,f_0$ ($f_0$ being the overall focal length of the system); the chromatic transverse aberration was found to amount to not more than $0.0001\,f_0$ for a band of wavelengths ranging between about 4860 A. and 6560 A. while the chromatic difference of the entrance-pupil aberration had magnitudes only slightly greater than $-0.001\,f_0$ in the central zone and $+0.002\,f_0$ at the periphery so that the Gaussian aberration may be regarded as substantially corrected.

In order to minimize the residual aberrations of the astigmatic and comatic image shells and to limit the diameters of the object side members, the large air space between the two components should be greater than 1.5 times the axial length of each component, more specifically of the image-side component which in turn should have an axial length greater than 1.5 that of the object-side component.

I have found that an objective constructed in accordance with the aforestated principles can be produced quite economically, with the two large members of the object-side component constituted by singlets whose mean refractive index is less than 1.7.

The sole figure of the accompanying drawing diagrammatically illustrates a projection objective according to this invention.

The objective shown in the drawing comprises an object-side component I, consisting of two air-spaced lens members L1 and L2, and an image-side component II, consisting of four air-spaced lens members L3, L4, L5 and L6–L7, the last-mentioned member being a doublet with a positively refracting cemented surface. Lens member L1 is a planoconvex singlet with radii of curvature $r1$, $r2$ and thickness $d1$; lens member L2, separated from member L1 by an air space $d2$, has radii $r3$, $r4$ and thickness $d3$. The large intercomponent air space $d4$ separates the meniscus-shaped lens member L2 from the biconvex lens member L3 (radii $r5$, $r6$, thickness $d5$) which in turn is separated by an air space $d6$ from the concavoconvex positive lens member L4 (radii $r7$, $r8$, thickness $d7$). Biconcave lens L5 (radii $r9$, $r10$, thickness $d9$), the only negative member of component II, is separated by an air space $d8$ from lens L4 and by an air space $d10$ from the positive doublet composed of elements L6 (radii $r11$, $r12$, thickness $d11$) and L7 (radii $r12$, $r13$, thickness $d12$). The back-focal length of the system has been indicated at $s'$.

The following Table A shows representative values for the parameters $r1$–$r13$ and $d1$–$d12$ of the illustrated objective system, based upon a numerical value of 100 units of length (e.g., millimeters) for the overall focal length $f_0$; this system has a relative aperture of 1:1.4 and a backfocal length $s'=87.22$. The refractive indices $n_e$ and the Abbé numbers $\nu$ given in the table are based on the E-line of the spectrum.

Table A

| Lens | | Radii of Curvature | Thicknesses and Separations | $n_e$ | $\nu$ |
|---|---|---|---|---|---|
| I | L1 | r1 = +555.40 | d1 = 30.0 | 1.65285 | 33.5 |
| | | r2 = ∞ | d2 = 10.0 | Air Space | |
| | L2 | r3 = +281.00 | d3 = 15.0 | 1.61521 | 58.4 |
| | | r4 = +103.40 | d4 = 290.0 | Air Space | |
| II | L3 | r5 = +242.00 | d5 = 20.0 | 1.62287 | 60.1 |
| | | r6 = −566.50 | d6 = 0.5 | Air Space | |
| | L4 | r7 = +110.20 | d7 = 40.0 | 1.62287 | 60.1 |
| | | r8 = +980.20 | d8 = 5.0 | Air Space | |
| | L5 | r9 = −1,697.50 | d9 = 35.0 | 1.76846 | 26.8 |
| | | r10 = +64.50 | d10 = 7.0 | Air Space | |
| | L6 | r11 = +88.15 | d11 = 10.0 | 1.52031 | 58.8 |
| | L7 | r12 = +71.02 | d12 = 20.0 | 1.73692 | 50.8 |
| | | r13 = −347.20 | | | |
| | | | $d_{total}$ = 482.5 | | |

The components I and II of the system represented by Table A have individual focal lengths $f_I = -438.8$ and $f_{II} = +135.4$, respectively, hence $$\left|\frac{f_I}{f_0}\right| = 4.388 > 2.5 \text{ and } \left|\frac{f_I}{f_{II}}\right| = 3.241 > 2.5.$$

It will also be noted that the large air space $d4$, having a length of 290, is greater than half the total axial length of the system and is more than double the axial length of each component, i.e., the sum $d1+d2+d3$ (55 units) and the sum of parameters $d5$ to $d12$ (137.5 units), respectively. It will also be seen that the last-mentioned value, i.e., the axial length of component II, is more than double the axial length of component I. The system, accordingly, satisfies the aforestated requirements that the intercomponent air space be greater than 1.5 times the axial length of component II and that the latter in turn be greater than 1.5 times the axial length of component I. Finally the mean value of the refractive indices of lenses L1 and L2 is given with 1.6340, being thus substantially less than 1.7. The front surface $r11$ of the sixth lens member L6, L7 is more strongly curved than its rear surface $r13$; its forwardly convex cemented surface $r12$ is positively refracting.

A modified system, with the same overall focal length and relative aperture but with a back-focal length of 87.20, utilizes a different object-side component as given in the following Table B.

Table B

| Lens | Radii of Curvature | Thicknesses and Separations | $n_e$ | $\nu$ |
|---|---|---|---|---|
| L1 | r1 = +598.90 | d1 = 30.0 | 1.70442 | 34.7 |
| | r2 = ∞ | d2 = 10.0 | Air Space | |
| L2 | r3 = +285.00 | d3 = 15.0 | 1.62287 | 60.1 |
| | r4 = +104.00 | | | |

The air space $d4$ and the parameters of component II are the same as in Table A.

The individual focal length $f_I$ of component I according to Table B is calculated with −430.8, hence in this case, too, $$\left|\frac{f_I}{f_0}\right| = 4.308 > 4.5 \text{ and } \left|\frac{f_I}{f_{II}}\right| = 3.181 > 2.5.$$

Again, the mean of the refractive indices of the first two lenses L1, L2 is less than 1.7, amounting in this case to 1.6636.

Although the invention has been disclosed with reference to specific numerical values, it is to be understood that modifications of the system described and illustrated are possible (e.g., through substitution of cemented members for certain of the singlets shown) without departing from the spirit and scope of the appended claims.

I claim:

1. An optical objective system consisting of a positively refracting image-side multi-lens component and a negatively refracting object-side component constituted by a positive first member and a negative second member air-spaced from said first member, said components being axially separated from each other by an air space greater than 1.5 times the axial length of said image-side component, the axial length of said image-side component, being greater than 1.5 times the axial length of said object-side component, the individual focal length of said object-side component having an absolute value greater than 2.5 times that of the individual focal length of said image-side component and also greater than 2.5 times the value of the overall focal length of the system, said image-side component consisting of a positive third member, a positive fourth member, a negative fifth member and a positive sixth member all air-spaced from one another, said third, fourth and fifth members being singlets, said sixth member being a doublet with a positively refracting cemented surface, the numerical values of the radii of curvature $r1$–$r13$ and of the thicknesses and separations $d1$–$d12$ of the lenses L1, L2, L3, L4, L5 respectively constituting said first, second, third, fourth and fifth members and of the lens elements L6, L7 of the doublet constituting said sixth member, based upon a numerical value of 100 for said overall focal length, along with their refractive indices $n_e$ and Abbé numbers $\nu$, based upon the E-line of the spectrum, being substantially as given in the following table:

| Lens | Radii of Curvature | Thicknesses and Separations | $n_e$ | $\nu$ |
|---|---|---|---|---|
| L1 | r1 = +555.40 | d1 = 30.0 | 1.65285 | 33.5 |
| | r2 = ∞ | d2 = 10.0 | Air Space | |
| L2 | r3 = +281.00 | d3 = 15.0 | 1.61521 | 58.4 |
| | r4 = +103.40 | d4 = 290.0 | Air Space | |
| L3 | r5 = +242.00 | d5 = 20.0 | 1.62287 | 60.1 |
| | r6 = −566.50 | d6 = 0.5 | Air Space | |
| L4 | r7 = +110.20 | d7 = 40.0 | 1.62287 | 60.1 |
| | r8 = +980.20 | d8 = 5.0 | Air Space | |
| L5 | r9 = −1,697.50 | d9 = 35.0 | 1.76846 | 26.8 |
| | r10 = +64.50 | d10 = 7.0 | Air Space | |
| L6 | r11 = +88.15 | d11 = 10.0 | 1.52031 | 58.8 |
| L7 | r12 = +71.02 | d12 = 20.0 | 1.73692 | 50.8 |
| | r13 = −347.20 | | | |

2. An optical objective system consisting of a positively refracting image-side multi-lens component and a negatively refracting object-side component constituted by a positive first member and a negative second member air-spaced from said first member, said components being axially separated from each other by an air space greater than 1.5 times the axial length of said image-side component, the axial length of said image-side component being greater than 1.5 times the axial length of said object-side component, the individual focal length of said object-side component having an absolute value greater than 2.5 times that of the individual focal length of said image-side component and also greater than 2.5 times the value of the overall focal length of the system, said image-side component consisting of a positive third member, a positive fourth member, a negative fifth member and a positive sixth member all air-spaced from one another, said third, fourth and fifth members being singlets, said sixth member being a doublet with a positively refracting cemented surface, the numerical values of the radii of curvature $r1$–$r13$ and of the thicknesses and separations $d1$–$d12$ of the lenses L1, L2, L3, L4, L5 respectively constituting said first, second, third, fourth and fifth members and of the lens elements L6, L7 of the doublet constituting said sixth member, based upon a numerical value of 100 for said overall focal length, along with their refractive indices $n_e$ and Abbé numbers $\nu$, based upon the E-line of the spectrum, being substantially as given in the following table:

| Lens | Radii of Curvature | Thicknesses and Separations | $n_e$ | $\nu$ |
|---|---|---|---|---|
| L1 | $r1 = +598.90$ | $d1 = 30.0$ | 1.70442 | 34.7 |
|  | $r2 = \infty$ | $d2 = 10.0$ | Air Space | |
| L2 | $r3 = +285.00$ | $d3 = 15.0$ | 1.62287 | 60.1 |
|  | $r4 = +104.00$ | $d4 = 290.0$ | Air Space | |
| L3 | $r5 = +242.00$ | $d5 = 20.00$ | 1.62287 | 60.1 |
|  | $r6 = -566.50$ | $d6 = 0.5$ | Air Space | |
| L4 | $r7 = +110.20$ | $d7 = 40.0$ | 1.62287 | 60.1 |
|  | $r8 = +980.20$ | $d8 = 5.0$ | Air Space | |
| L5 | $r9 = -1,697.50$ | $d9 = 35.0$ | 1.76846 | 26.8 |
|  | $r10 = +64.50$ | $d10 = 7.0$ | Air Space | |
| L6 | $r11 = +88.15$ | $d11 = 10.0$ | 1.52031 | 58.8 |
| L7 | $r12 = +71.02$ | $d12 = 20.0$ | 1.73692 | 50.8 |
|  | $r13 = -347.20$ | | | |

References Cited by the Examiner

UNITED STATES PATENTS 2,649,022  8/1953  Angienieux _____ 88—57
2,696,758  12/1954 Angienieux _____ 88—57
3,099,701  7/1963  Merigold _____ 88—57

JEWELL H. PEDERSEN, *Primary Examiner.*

JOHN K. CORBIN, *Examiner.*